E. M. FRANKEL AND K. G. FALK.
APPARATUS FOR PRESERVING FOOD.
APPLICATION FILED AUG. 13, 1918.
1,418,638.
Patented June 6, 1922.
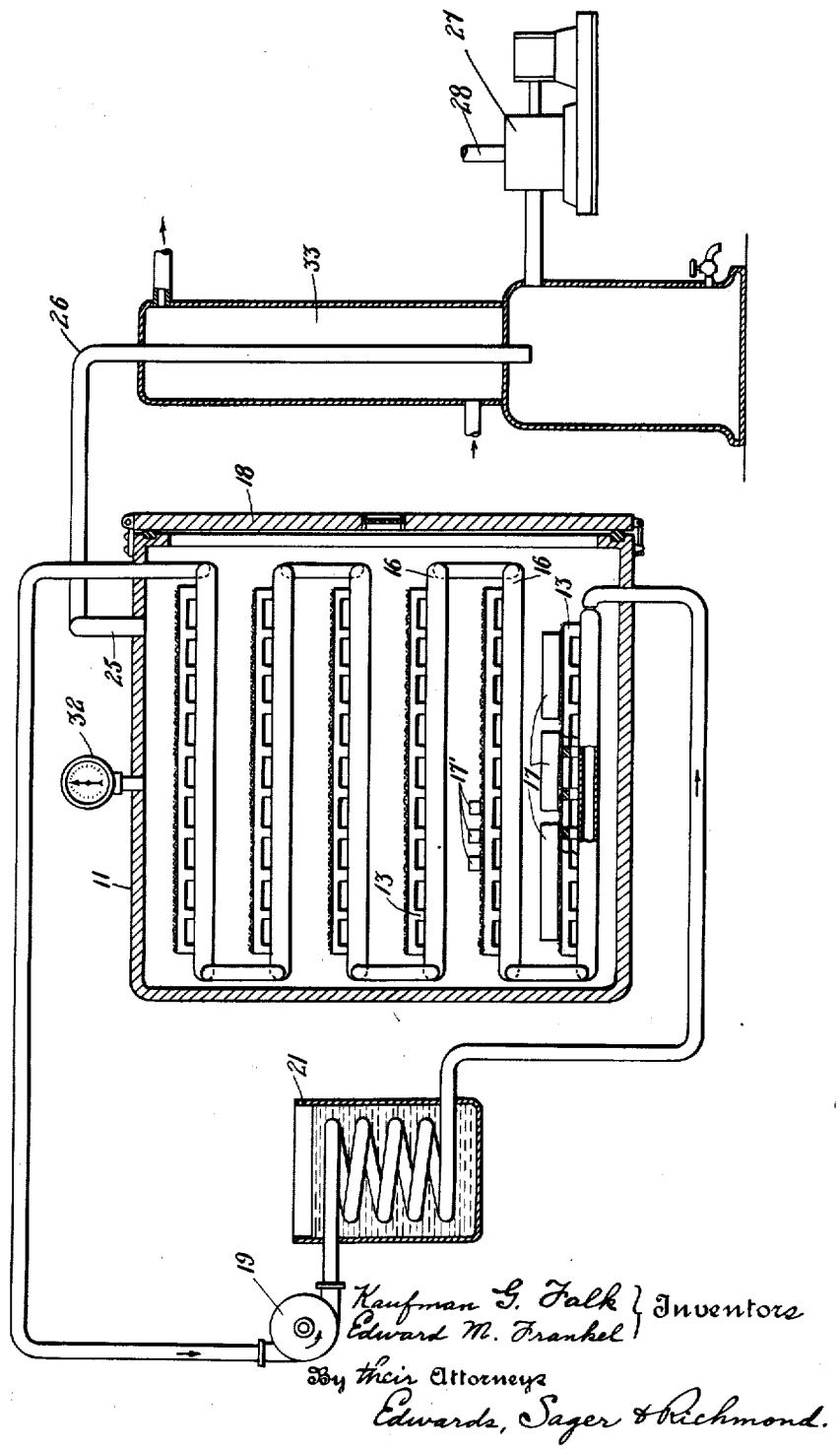

UNITED STATES PATENT OFFICE.

EDWARD M. FRANKEL AND KAUFMAN GEORGE FALK, OF NEW YORK, N. Y., ASSIGNORS TO WILLIAM G. LYLE, TRUSTEE, OF NEW YORK, N. Y.

APPARATUS FOR PRESERVING FOOD.

1,418,638.  Specification of Letters Patent.  Patented June 6, 1922.

Original application filed January 30, 1918, Serial No. 214,449. Divided and this application filed August 13, 1918. Serial No. 249,738.

*To all whom it may concern:*

Be it known that we, EDWARD M. FRANKEL and KAUFMAN GEORGE FALK, citizens of the United States, residing at New York, in the county of New York and State of New York, have invented certain new and useful Improvements in Apparatus for Preserving Food, of which the following is a specification.

The principal object of our invention is to provide new and improved apparatus by which food may be advantageously preserved by drying it. This and other objects of our invention will be made apparent in the following specification and claim taken with the accompanying drawing, in which one specific embodiment of our invention is disclosed. It will be understood that modifications may be made within the scope of our invention.

Hitherto it has been found generally impracticable to preserve meat by drying it without first subjecting the meat to the action of some preservative agent. For example, so-called "dried beef" is beef that has first been "corned" or otherwise treated with a preservative. Hams and bacon are dried by being smoked, but the smoke contains preservative agents which are essential in the process. When it has been attempted to dry meat directly, one difficulty that has been experienced was that before the drying could be carried far enough, decomposition due to the presence of bacteria or other forms of life would set in and defeat the aim. If it was attempted to hasten the process by raising the temperature this would not only promote the development of the bacteria, but if the temperature were raised too high the meat would cook, or its composition be changed, or the fats in the meat would melt and prevent further drying, and moreover become rancid. Attempts have also been made to dry meat by a vacuum process, but failure has resulted from such efforts because the drying cannot be accomplished merely by maintaining a vacuum but the proper application of heat must be made at the same time and there are conditions which require especial care to be given in this connection.

We will now explain one specific course of procedure for drying meat that may be taken as illustrative of our invention. The accompanying drawing will be referred to, but this is highly diagrammatic and intended primarily to aid in fixing the ideas that are involved.

In the vacuum chamber 11 is a series of shelves 16 of heat conductive material, each shelf being hollow so that warm water may be made to circulate through it as will be pointed out presently. On the shelves 16 are placed movable trays 13 sliding in and out of the vacuum chamber 11. The trays 13 are made of good conducting non-corrosive metallic frames over which a wire gauze is fastened for a purpose to be pointed out presently. On the wire gauze are placed slices of fresh meat 17, or pieces cut in cubes as indicated by the reference character 17.

The shelves are connected by suitable piping with a centrifugal pump 19 which causes the water to circulate passing through the heater 21, hollow shelves 16 in vacuum chamber 11 and back to the pump 19 as indicated in the drawing.

The vacuum is maintained in the chamber 11 by means of the air and vapor pump 27 drawing through the pipe 26 which opens at 25 into the chamber 11 and the exhausted air and vapor are passed through the condenser 33 which removes the greater part of the aqueous vapor and the remaining air and vapor is delivered from the pump at 28.

The vacuum chamber 11 has a door 18 which may be moved aside and the trays moved out and the dried meat removed therefrom and a supply of fresh meat put in place.

Of course any suitable means may be employed for creating or maintaining the vacuum, and in most cases, as in preserving meat for example, it is important to avoid breaking the vacuum, or otherwise unduly exposing the substance to air, during the heating process.

After loading the trays up with fresh meat they are pushed back into the chamber 11, the door 18 is closed, and warm water is circulated through the hollow shelves 16, the temperature being kept by the heater 21 so that in the shelves 16 it is at about 60° C. or a little below this limit. By means of the metallic frames and wire gauze of the trays 13, the heat is conducted to the meat and the temperature thereof raised to that of the trays and shelves. At the same time the air exhausting pump 27 is kept in operation so as to maintain a vacuum in the chamber 11 corresponding to about two inches of mercury. The temperature may be observed through a window in the wall of the chamber 11 as registered by a thermometer within, and the pressure may be observed by means of the gauge 32. The meat being raised from the shelves by means of the gauge supports, evaporation downward as well as in other directions is permitted, and thus the time required for evaporation is reduced.

At the pressure and temperature stated, water will boil; that is, an open vessel of water in the chamber 11 maintained at the temperature of 60° C. would boil with the pressure in the chamber maintained at or below two inches of mercury. Of course, the meat juice is a water solution of a variety of substances together with a colloidal protein solution; and its vapor pressure is not substantially different from that of pure water. Heat at the temperature mentioned is communicated readily by direct conduction to the pieces of meat 17 and 17', and the effect is practically to boil the moisture out of the meat, but of course this is accomplished without the effects commonly due to boiling meat, because when meat is boiled in the open air it is at a temperature of approximately 100° C. and this temperature effects important changes which are entirely absent at 60° C. The moisture driven out of the meat in this way forms a vapor in the chamber 11, but this is condensed at 33 and then continually drawn off by the pump 27. By working within the limits of temperature and pressure stated the growth of bacteria during the process is not promoted and the drying is effected before any bacterial or chemical decomposition takes place. Moreover, below the temperature of 60° in the substantial absence of air the fats in the meat are not melted and do not become rancid. By the removal of water the concentration of salts is increased and their preservative effect is secured without the addition of any external preserving agent. Within the temperature and pressure limits stated no cornified layer is formed on the surface of the meat as might be the case for drying at a higher temperature. The chemical composition of the meat is substantially unchanged, the only change being the removal of water. Ordinary fresh meat consists of about 75% of water and of this quantity about 65% of the whole is removed, leaving 10% of water of the original whole in the meat or about 29% of water in the dried product. Bacteria do not develop with so small a percentage of water in the medium. Salt concentration also is unfavorable for bacterial growth.

The physical character of the sections of the meat is also of some importance. For best results the direction of cut should be longitudinal with the fibre instead of transverse. Longitudinal cutting favors the evaporation of water from the cells in the interior, due to spreading of fibre on drying.

With our improved process and apparatus the meat can be trimmed of bone and fat, etc., immediately after slaughtering and sent to the vacuum drier without cooling it; indeed the retention of the animal heat is of advantage. Hence, it will be seen that the procedure saves delay and avoids the disadvantages of storage of the fresh meat and particularly there is no necessity for cold storage. The shipment of bone and fat from the slaughter house is made unnecessary and also the shipment of large water content in the meat is avoided. After the meat is dried it can be packed in any suitable manner to keep it clean as, for example, wrapped in paraffin paper, and shipped. When it is to be used it can be readily soaked up in a short time in water. To be cooked by stewing, the dried meat may be put directly in the hot water. Steaks may be soaked up in a small quantity of temperate water and will become like fresh steaks ready for broiling.

This application is a division of our application, Serial No. 214,449, filed January 30, 1918.

We claim:—

Apparatus for preserving food comprising, a vacuum chamber having a shelf adapted to have a heating fluid circulate in contact with its under side, a removable tray on said shelf comprising a grid-like structure providing portions contacting with said shelf and intermediate air passages between the shelf and tray, and a wire gauze support for the material resting in contact with the surface of said tray, so that the food is heated by conduction from the heated shelf and is exposed to air currents from beneath.

EDWARD M. FRANKEL.
KAUFMAN GEORGE FALK.